US008295172B1

(12) United States Patent
Singla et al.

(10) Patent No.: US 8,295,172 B1
(45) Date of Patent: Oct. 23, 2012

(54) NETWORK DEVICE TRAFFIC CLASS MAPPING FUNCTION

(75) Inventors: Ankur Singla, San Jose, CA (US); Harshad Nakil, San Jose, CA (US); Rajashekar Reddy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 567 days.

(21) Appl. No.: 11/763,112

(22) Filed: Jun. 14, 2007

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ...................................... 370/230.1

(58) Field of Classification Search ............... 370/230, 370/231, 235, 395.4, 395.42, 395.41
See application file for complete search history.

(56) References Cited

U.S. PATENT DOCUMENTS

| 6,438,134 | B1 * | 8/2002 | Chow et al. .................. 370/412 |
| 6,631,136 | B1 * | 10/2003 | Chowdhury et al. .... 370/395.31 |
| 2002/0110120 | A1 * | 8/2002 | Hagglund et al. ............ 370/389 |
| 2007/0036546 | A1 * | 2/2007 | Islam ............................ 398/51 |
| 2007/0121513 | A1 * | 5/2007 | Zeitak .......................... 370/235 |
| 2008/0259927 | A1 * | 10/2008 | Evans et al. .................. 370/394 |

* cited by examiner

*Primary Examiner* — Huy D Vu
*Assistant Examiner* — Adnan Baig
(74) *Attorney, Agent, or Firm* — Harrity & Harrity, LLP

(57) ABSTRACT

A device receives network traffic and bypass traffic, performs a first weighting operation on the network traffic and the bypass traffic to produce weighted network traffic and weighted bypass traffic, performs a second weighting operation on the weighted network traffic and the weighted bypass traffic to produce additionally weighted traffic, and transmits the additionally weighted traffic based on weights assigned by the second weighting operation.

31 Claims, 7 Drawing Sheets

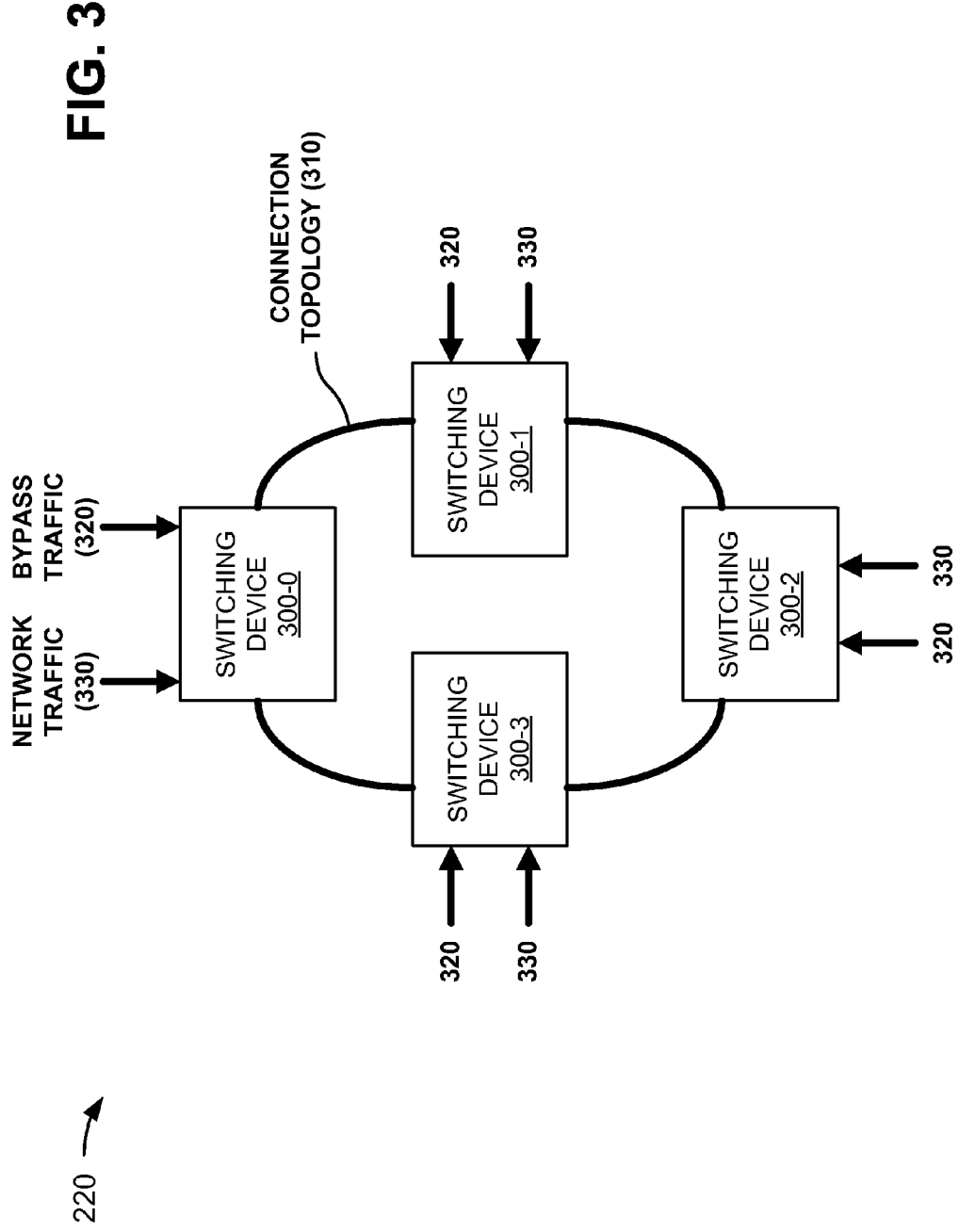

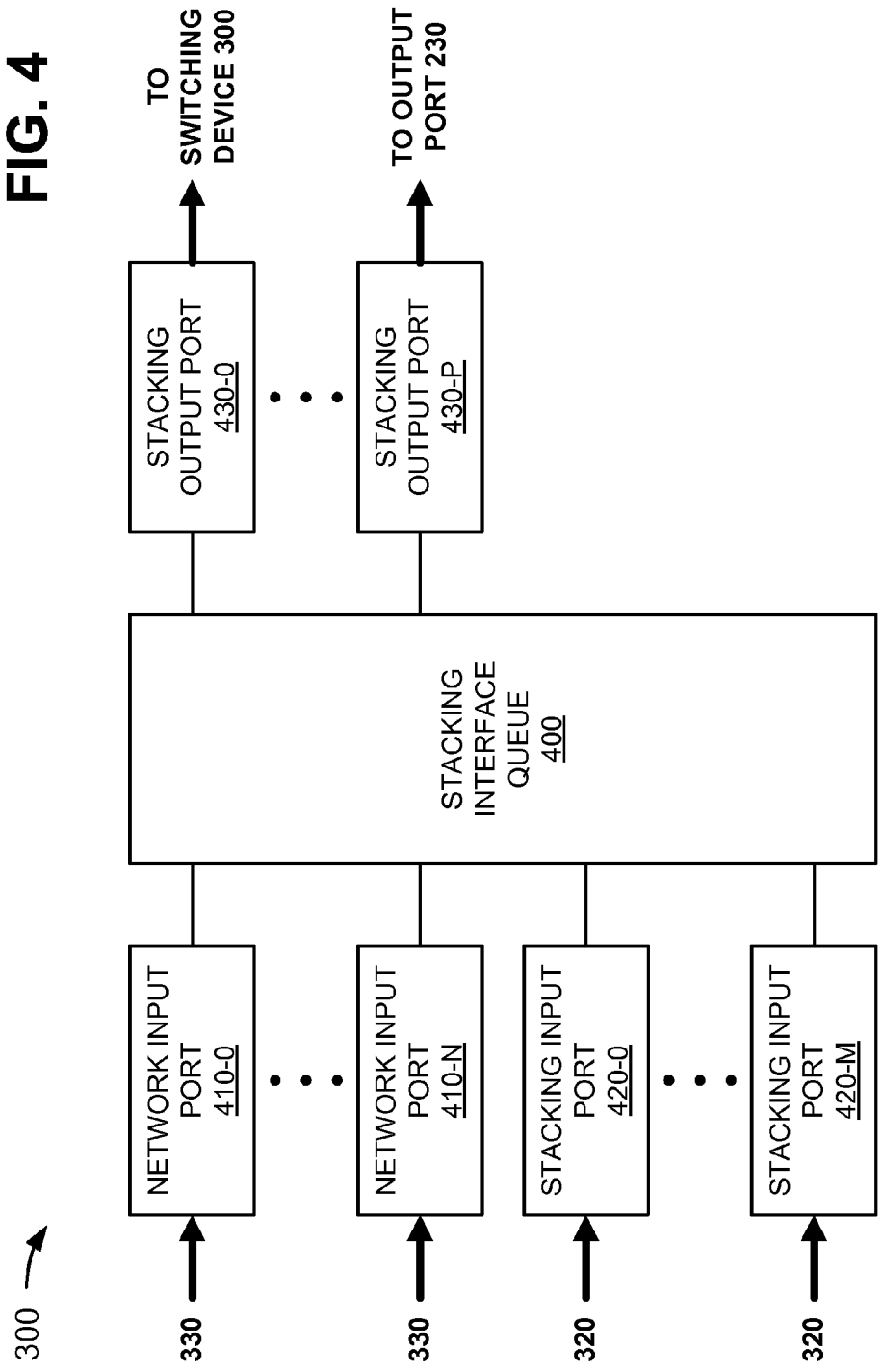

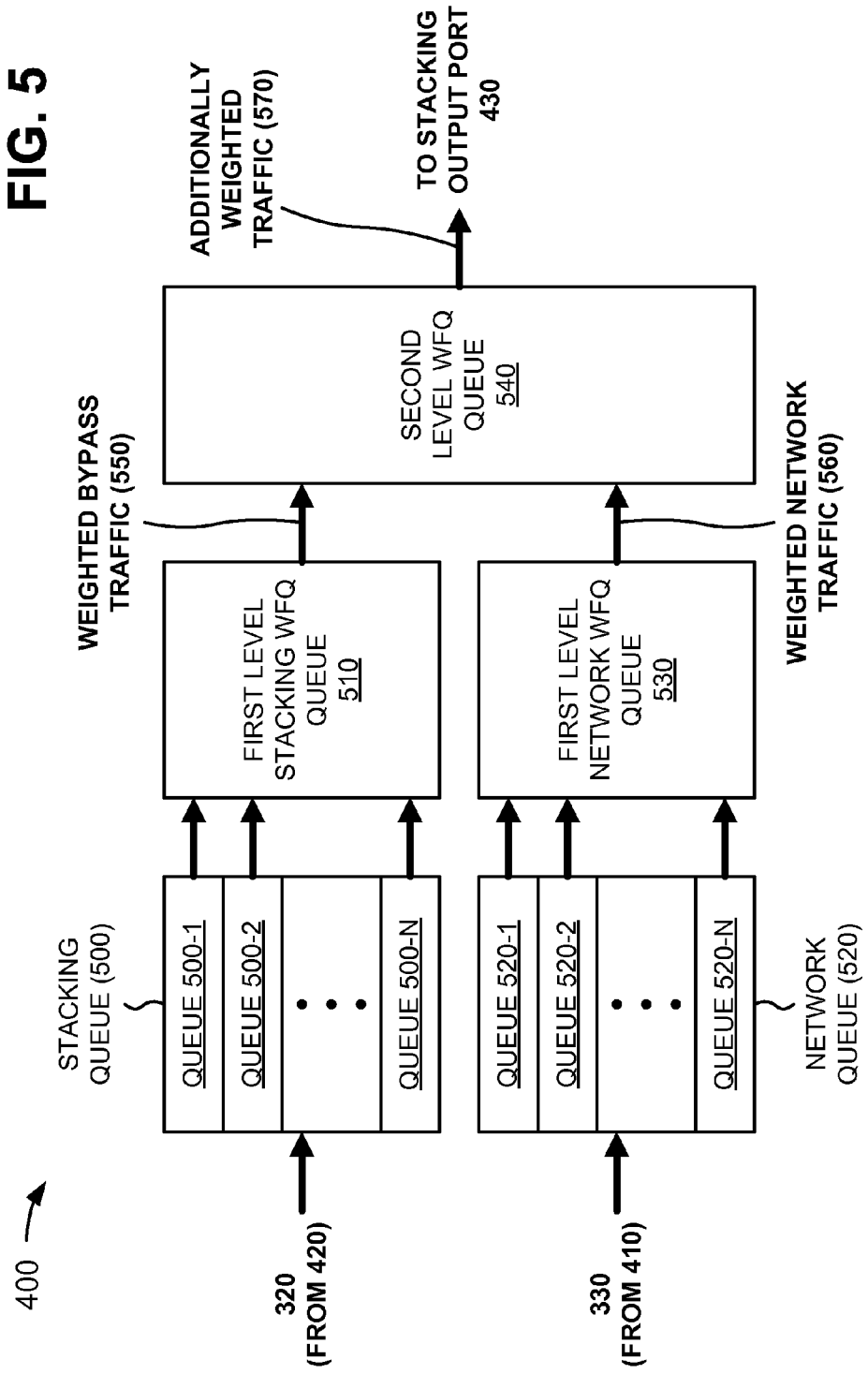

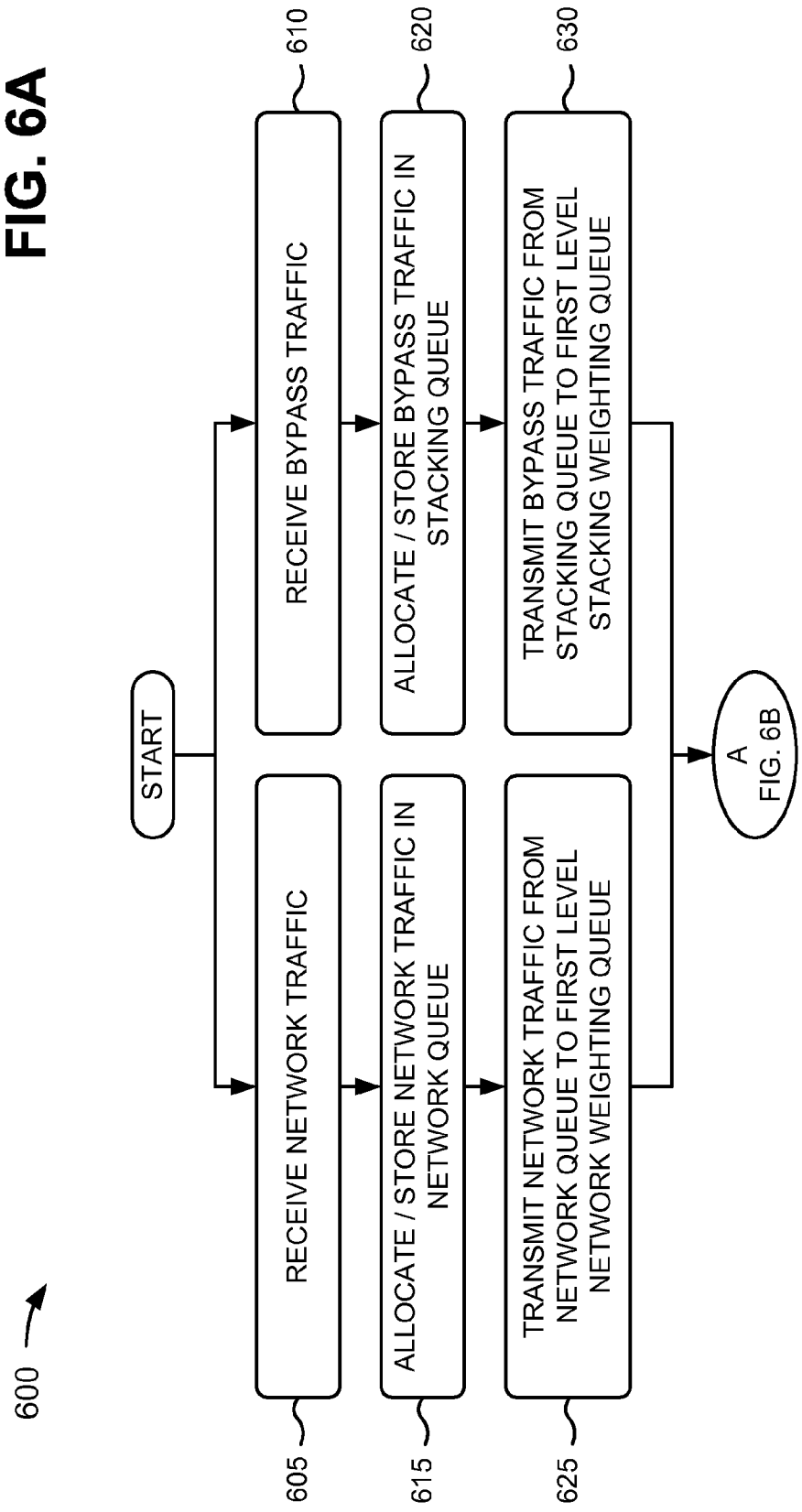

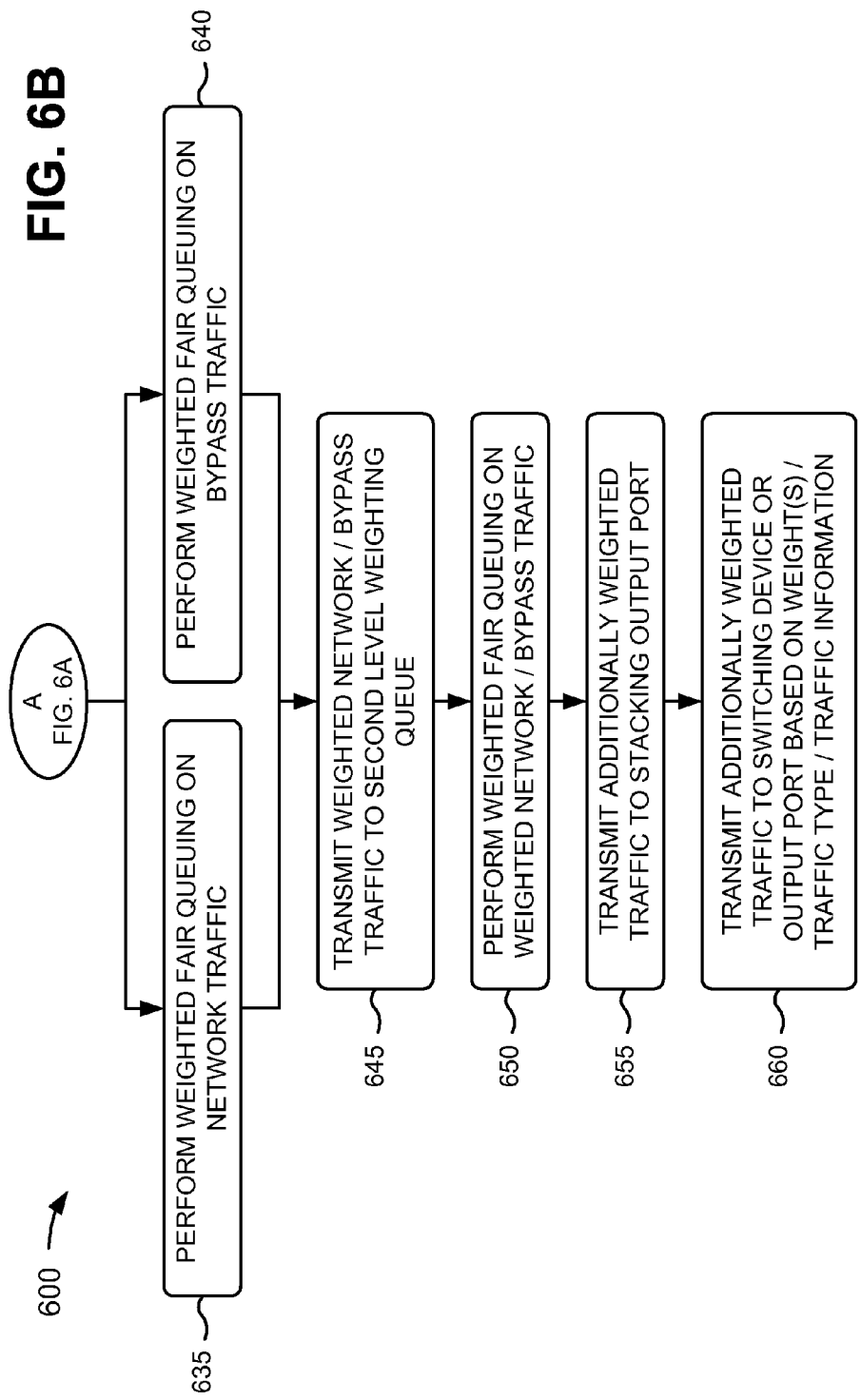

NETWORK DEVICE TRAFFIC CLASS MAPPING FUNCTION

BACKGROUND

Network devices, such as stackable Ethernet switches and/or routers, receive data on physical media, such as optical fiber, analyze the data to determine its destination, and output the data on physical media in accordance with the destination. Typically, such network devices include multiple switching silicon devices that properly route data received on an input port to an output destination port. These switching silicon devices include network ports that receive network traffic to be forwarded to an output port of the network device, and may include stacking ports that receive bypass traffic to be forwarded to another switching mechanism of the network device. Typically, the switching silicon devices include dedicated stacking ports that are designed the same as the network ports in order to provide flexibility in configurability and/or use of these in the network device. However, such an arrangement overwhelms the switching buffers and/or the queuing sub-system of the silicon device, thereby leading to incorrect quality of service (QoS) metrics being applied on the network traffic. For example, the ports of the switching silicon device may be overwhelmed by the network traffic ingress into the switching mechanism and/or by the bypass traffic entering the stacking port from other switching silicon devices of the network device. This may further deny proper quality of service (QoS) to the network traffic and/or the bypass traffic.

SUMMARY

According to one aspect, a method may include receiving network traffic or bypass traffic with a network port in a switching device, if the network port is configured as a stacking port, then performing a first weighting operation on the network traffic and the bypass traffic to produce weighted network traffic and weighted bypass traffic, performing a second weighting operation on the weighted network traffic and the weighted bypass traffic to produce additionally weighted traffic, and transmitting the additionally weighted traffic based on weights assigned by the second weighting operation.

According to another aspect, a system may include one or more devices configured to receive network traffic and bypass traffic, perform a first weighting operation on the network traffic and the bypass traffic to produce weighted network traffic and weighted bypass traffic, perform a second weighting operation on the weighted network traffic and the weighted bypass traffic to produce additionally weighted traffic, and transmit the additionally weighted traffic based on weights assigned by the second weighting operation.

According to yet another aspect, a network device may include a stacking queue that receives bypass traffic and allocates the bypass traffic in a first group of queues, a network queue that receives network traffic and allocates the network traffic in a second group of queues, and a first level stacking queue that receives the bypass traffic from the stacking queue and performs a first weighting operation on the bypass traffic to produce weighted bypass traffic. The device may also include a first level network queue that receives the network traffic from the network queue and performs the first weighting operation on the network traffic to produce weighted network traffic, and a second level queue that receives the weighted bypass traffic and the weighted network traffic, and performs a second weighting operation on the weighted bypass traffic and the weighted network traffic to produce additionally weighted traffic.

According to a further aspect, a system may include means for receiving network traffic and bypass traffic, means for performing a first weighting operation on the network traffic and the bypass traffic to produce weighted network traffic and weighted bypass traffic, means for performing a second weighting operation on the weighted network traffic and the weighted bypass traffic to produce additionally weighted traffic, and means for transmitting the additionally weighted traffic based on weights assigned by the second weighting operation.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 3 is a diagram of an exemplary switching mechanism of the exemplary network device depicted in FIG. 2;

FIG. 4 is a diagram of an exemplary switching device of the exemplary switching mechanism depicted in FIG. 3;

FIG. 5 is a diagram of an exemplary stacking interface queue of the exemplary switching device depicted in FIG. 4; and FIGS. 6A and 6B is a flowchart of an exemplary process according to an implementations described herein.

DETAILED DESCRIPTION

The following detailed description refers to the accompanying drawings. The same reference numbers in different drawings may identify the same or similar elements. Also, the following detailed description does not limit the invention.

Systems and methods described herein may provide a network device traffic class mapping function. For example, in one implementation, the network device may receive network traffic on a network port of a switching silicon device, and may receive bypass traffic on a stacking port of the switching device. The switching silicon device may allocate and/or store the network traffic in a network queue, and may allocate and/or store the bypass traffic in a stacking queue. The switching silicon device may perform a first level weighted fair queuing (WFQ) operation on the network traffic and/or the bypass traffic, and may perform a second WFQ operation on the weighted network traffic and/or the weighted bypass traffic. The switching silicon device may transmit the additionally weighted traffic to another switching silicon device of the network device or to an output port of the network device based on weights assigned to the additionally weighted traffic, traffic type (e.g., network traffic, bypass traffic, etc.), and/or other traffic information (e.g., quality of service desired for the traffic, bandwidth requirements, etc.).

Exemplary Network Overview

Figure 1:
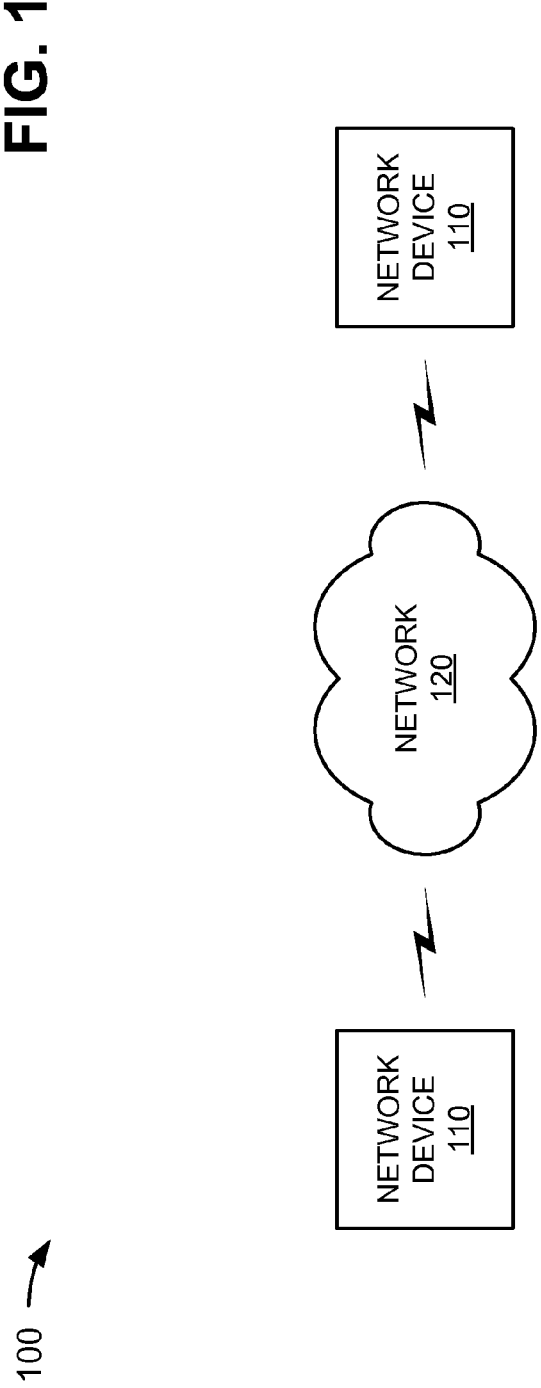
FIG. 1 is a diagram illustrating an exemplary network in which systems and methods described herein may be implemented.

FIG. 1 is a diagram illustrating an exemplary network 100 in which systems and methods described herein may be implemented. As shown in FIG. 1, network 100 may include network devices 110 interconnected via a network 120. Two network devices 110 and one network 120 have been illustrated in FIG. 1 for simplicity. In practice, there may be more network devices 110 and/or networks 120.

Each of network devices 110 may include a data transfer device, such as a gateway, a router, a switch, a firewall, a network interface card (NIC), a hub, a bridge, a proxy server, or some other type of device that processes and/or transfers data. In one example, each of network devices 110 may be capable of transmitting and/or receiving network traffic (e.g., any type or form of data, such as packet or non-packet data).

Network 120 may include a local area network (LAN), a wide area network (WAN), a metropolitan area network (MAN), a telephone network, such as the Public Switched Telephone Network (PSTN) or a cellular telephone network, an intranet, the Internet, or a combination of networks. Network devices 110 may connect to network 120 via wired and/or wireless connections.

Although FIG. 1 shows exemplary components of network 100, in other implementations, network 100 may contain fewer, different, or additional components than depicted in FIG. 1. In still other implementations, one or more components of network 100 may perform one or more of the tasks described below as being performed by one or more other components of network 100.

Exemplary Network Device Configuration

Figure 2:
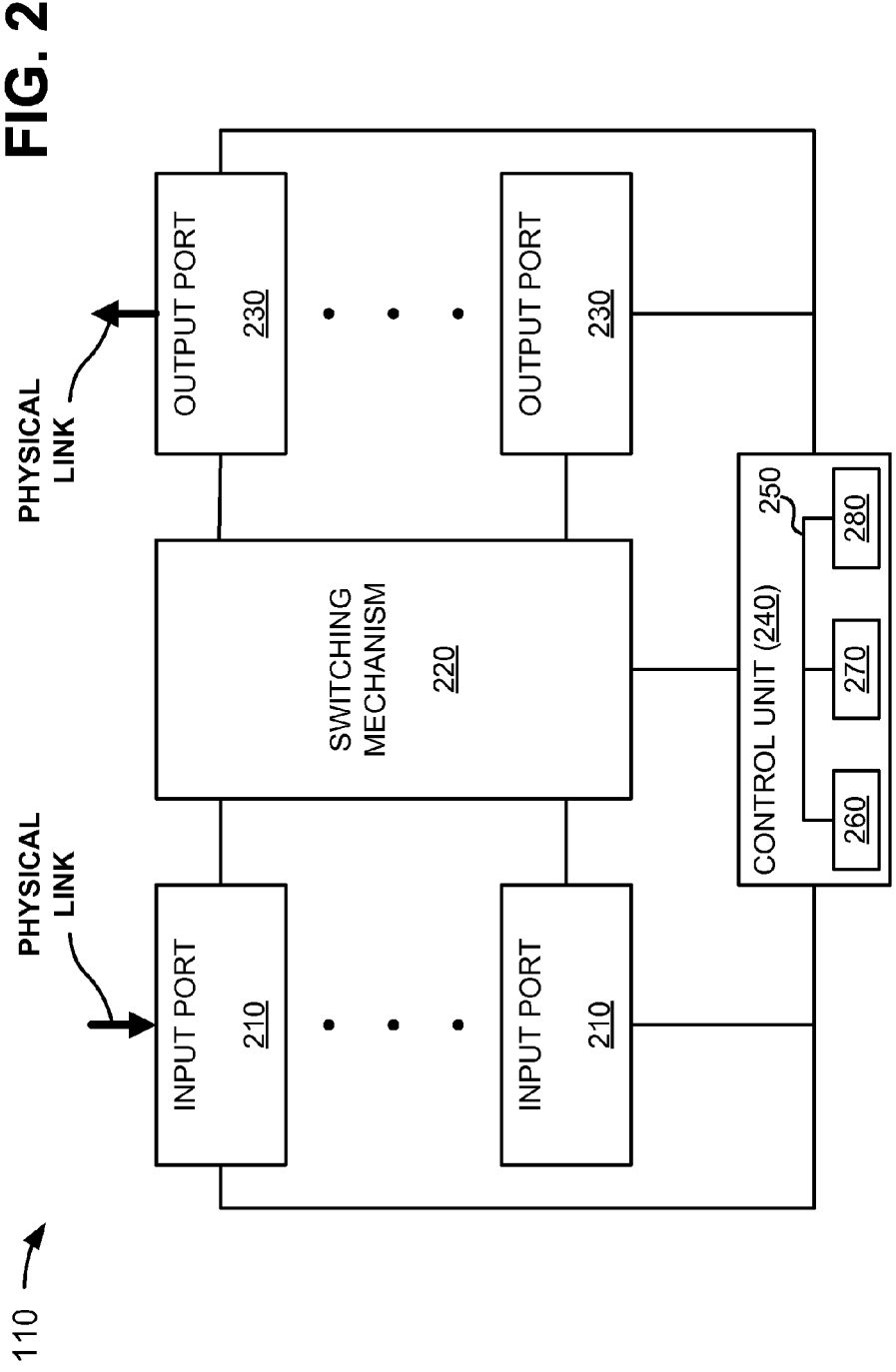
FIG. 2 is a diagram of an exemplary network device of the exemplary network depicted in FIG. 1.

FIG. 2 is an exemplary diagram of a device that may correspond to one of network devices 110 illustrated in FIG. 1. Network device 110 may include input ports 210, a switching mechanism 220, output ports 230, and/or a control unit 240. Input ports 210 may be the points of attachments for physical links and may be the points of entry for incoming traffic. Switching mechanism 220 may interconnect input ports 210 with output ports 230. Output ports 230 may store the traffic and may schedule the traffic on one or more output physical links. Control unit 240 may use routing protocols and may create a forwarding table that is used in traffic forwarding.

Input ports 210 may carry out datalink layer encapsulation and decapsulation. Input ports 210 may look up a destination address of incoming traffic (e.g., any type or form of data, such as packet or non-packet data) in a forwarding table to determine its destination port (i.e., route lookup). In order to provide QoS guarantees, input ports 210 may classify traffic into predefined service classes. Input ports 210 may run datalink-level protocols and/or network-level protocols.

Switching mechanism 220 may provide a link between input ports 210 and output ports 230. For example, switching mechanism 220 may include a group of switching devices that route traffic from input ports 210 to output ports 230. Further details of switching of switching mechanism 220 are described below in connection with FIG. 3.

Output ports 230 may store traffic before it is transmitted on an output link. Output ports 230 may include scheduling algorithms that support priorities and guarantees. Output ports 230 may support datalink layer encapsulation and decapsulation, and/or a variety of higher-level protocols.

Control unit 240 may interconnect with input ports 210, switching mechanism 220, and output ports 230. Control unit 240 may compute a forwarding table, use routing protocols, and/or run software to configure and manage network device 110. Control unit 240 may handle any traffic whose destination address may not be found in the forwarding table.

In one implementation, control unit 240 may include a bus 250 that may include a path that permits communication among a processor 260, a memory 270, and a communication interface 280. Processor 260 may include a microprocessor or processing logic (e.g., an application specific integrated circuit (ASIC), field programmable gate array (FPGA), etc.) that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Network device 110 may perform certain operations, as described in detail below. Network device 110 may perform these operations in response to processor 260 executing software instructions contained in a computer-readable medium, such as memory 270. A computer-readable medium may be defined as a physical or logical memory device and/or carrier wave.

The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of network device 110, in other implementations, network device 110 may contain fewer, different, or additional components than depicted in FIG. 2. In still other implementations, one or more components of network device 110 may perform one or more of the tasks described below as performed by one or more other components of network device 110.

Exemplary Switching Mechanism Configuration

FIG. 3 is an exemplary diagram of switching mechanism 220 of one of network devices 110. As illustrated, switching mechanism 220 may include one or more switching devices 300-0, 300-1, 300-2, and 300-3 (collectively referred to as "switching devices 300") that may be connected via a connection topology 310.

Each of switching devices 300 may include a device that may perform switching operations for traffic. For example, each of switching devices 300 may include a switching silicon device, a switching chip (e.g., a silicon bilateral switch (SBS) chip, a silicon unilateral switch (SUS) chip, a silicon controlled switch (SCS) chip, etc.), an ASIC, an Ethernet switch (e.g., Ethernet switch devices available from Broadcom Corporation, Marvell, etc.), a switching integrated circuit (IC), etc. Further details of switching devices 300 are provided below in connection with FIG. 4.

Connection topology 310 may include any network topology used to arrange and/or map elements of a network device (e.g., switching devices 300 of network device 110). For example, connection topology 310 may include a bus (or linear) topology, a star topology, a ring topology, a chain topology, a mesh (e.g., a partially connected mesh or fully connected mesh) topology, a tree topology, and/or combinations of one or more of the aforementioned topologies. In one exemplary implementation, connection topology 310 may permit each of switching devices 300 to communicate with one or more other switching devices 300.

In one exemplary implementation, as shown in FIG. 3, each of switching devices 300 may include ports (not shown) that may receive bypass traffic 320 (via connection topology 310) and/or network traffic 330. Network device 110 (e.g., control logic within one of switching devices 300 or control unit 240 of network device 110) may determine whether traffic is bypass traffic 320 and/or network traffic 330 (e.g., based on address information or based on whether or not the traffic is coming from connection topology 310), and may route the traffic based on the determined traffic type. For example, network device 110 may route bypass traffic 320 to certain ports of switching devices 300, and/or may route network traffic 330 to other ports of switching devices 300, as described below in connection with FIG. 4.

Bypass traffic 320 (also referred to as transit traffic or stacking traffic) may include any traffic whose destination port is connected to another one of switching devices 300. For example, if switching device 300-0 receives traffic destined for a port connected to switching device 300-1, such traffic may be classified as bypass traffic.

Network traffic 330 (also referred to as ingress traffic) may include any traffic received by one of switching devices 300 whose destination port is provided by the any one of switching devices 300. For example, if switching device 300-0 receives traffic destined for a port connected to switching device 300-0, such traffic may be classified as network traffic.

Although FIG. 3 shows exemplary components of switching mechanism 220, in other implementations, switching mechanism 220 may contain fewer, different, or additional components than depicted in FIG. 3. In still other implementations, one or more components of switching mechanism 220 may perform one or more of the tasks performed by one or more other components of switching mechanism 220.

Exemplary Switching Device Configuration

FIG. 4 is an exemplary diagram of one of switching devices 300 of switching mechanism 220. As illustrated, one of switching devices 300 may include a stacking interface queue 400, one or more network input ports 410-0, ..., 410-N (collectively referred to as "network input ports 410"), one or more stacking input ports 420-0, ..., 420-M (collectively referred to as "stacking input ports 420"), and/or one or more stacking output ports 430-0, ... 430-P (collectively referred to as "stacking output ports 430").

Stacking interface queue 400 may include a flexible mapping function or mechanism that may permit network traffic 330 received by network input ports 410 to be treated differently than bypass traffic 320 received at stacking input ports 420. Stacking interface queue 400 may prevent the two traffic types (e.g., bypass traffic 320 and network traffic 330) from denying service to each other, and may help provide adequate bandwidth for the two traffic types. Further details of stacking interface queue 400 are provided below in connection with FIG. 5.

If network device 110 (e.g., control unit 240 of network device 110) determines that traffic is network traffic 330, then such network traffic 330 may be routed to network input ports 410. Network input ports 410 may be the points of entry for incoming network traffic 330. Network input ports 410 may look up a destination address of incoming network traffic 330 in a forwarding table to determine its destination port (i.e., route lookup). In one implementation, each of switching devices 300 may include one (1) to twenty-four (24) network input ports 410. In other implementations, each of switching devices 300 may include more than twenty-four (24) network input ports 410.

If network device 110 (e.g., control unit 240 of network device 110) determines that traffic is bypass traffic 320, then such bypass traffic 320 may be routed to stacking input ports 420. Stacking input ports 420 may be the points of entry for incoming bypass traffic 320. Stacking input ports 420 may look up a destination address of incoming bypass traffic 320 in a forwarding table to determine its destination port (i.e., route lookup). In one implementation, each of switching devices 300 may include one (1) to four (4) stacking input ports 420. In other implementations, each of switching devices 300 may include more than four (4) stacking input ports 420.

Stacking output ports 430 may store traffic before it is transmitted on an output link (e.g., via one of output ports 230) or to another one of switching devices 300. Stacking output ports 430 may include scheduling algorithms that support priorities and guarantees for the traffic. In one implementation, as shown in FIG. 4, stacking output ports 430 (e.g., stacking output port 430-0) may transmit traffic (e.g., bypass traffic 320) to another one of switching devices 300. In another implementation, stacking output ports 430 (e.g., stacking output port 430-P) may transmit traffic (e.g., network traffic 330) to one of output ports 230.

Although FIG. 4 shows exemplary components of switching device 300, in other implementations, switching device 300 may contain fewer, different, or additional components than depicted in FIG. 4. In still other implementations, one or more components of switching device 300 may perform one or more of the tasks described below as being performed by one or more other components of switching device 300.

Exemplary Stacking Interface Queue Configuration

FIG. 5 is an exemplary diagram of stacking interface queue 400 of one of switching devices 300. As illustrated, stacking interface queue 400 may include a stacking queue 500, a first level stacking weighted fair queuing (WFQ) queue 510, a network queue 520, a first level network WFQ queue 530, and/or a second level WFQ queue 540.

Stacking queue 500 may include a mechanism for allocating and storing traffic (e.g., bypass traffic 320) until the traffic is ready to be processed (e.g., forwarded, transmitted, etc.). As shown in FIG. 5, stacking queue 500 may include one or more queues 500-1, 500-2, ..., 500-N that may receive and/or store bypass traffic 320 (e.g., provided by stacking input ports 420). In one implementation, stacking queue 500 may evenly allocate bypass traffic 320 to queues 500-1, 500-2, ..., 500-N. In other implementations stacking queue 500 may allocate bypass traffic 320 to queues 500-1, 500-2, ..., 500-N according to another allocation technique (e.g., stacking queue 500 may allocate bypass traffic 320 to one of queues 500-1, 500-2, ..., 500-N until the queue reaches its capacity, and then may allocate bypass traffic 320 to the next one of queues 500-1, 500-2, ..., 500-N, etc.). As further shown in FIG. 5, stacking queue 500 may transmit queued bypass traffic 320 to first level stacking WFQ queue 510.

First level stacking WFQ queue 510 may receive the queued bypass traffic 320 from one or more queues 500-1, 500-2, ..., 500-N of stacking queue 500, and may perform a weighting operation on the queued bypass traffic 320. For example, in one implementation, first level stacking WFQ queue 510 may perform a weighted fair queuing (WFQ) operation on the queued bypass traffic 320. The WFQ operation may assign different scheduling priorities (e.g., weights) to each of the queued bypass traffic 320 exiting from queues 500-1, 500-2, ..., 500-N (e.g., bypass traffic 320 exiting queue 500-1 may include a highest scheduling priority, bypass traffic 320 exiting queue 500-2 may include the next highest scheduling priority, etc.). In other implementations, first level stacking WFQ queue 510 may perform other weighting operations (e.g., fair queuing, etc.) on the queued bypass traffic 320. First level stacking WFQ queue 510 may store and/or may transmit weighted bypass traffic 550 to second level WFQ queue 540.

Network queue 520 may include a mechanism for allocating and storing traffic (e.g., network traffic 330) until the traffic is ready to be processed (e.g., forwarded, transmitted, etc.). As shown in FIG. 5, network queue 520 may include one or more queues 520-1, 520-2, . . . , 520-N that may receive and/or store network traffic 330 (e.g., provided by network input ports 410). In one implementation, network queue 520 may evenly allocate network traffic 330 to queues 520-1, 520-2, . . . , 520-N. In other implementations, network queue 520 may allocate network traffic 330 to queues 520-1, 520-2, . . . , 520-N according to another allocation technique (e.g., network queue 520 may allocate network traffic 330 to one of queues 520-1, 520-2, . . . , 520-N until the queue reaches its capacity, and then may allocate network traffic 330 to the next one of queues 520-1, 520-2, . . . , 520-N, etc.). As further shown in FIG. 5, network queue 520 may transmit queued network traffic 330 to first level network WFQ queue 530.

First level network WFQ queue 530 may receive the queued network traffic 330 from one or more queues 520-1, 520-2, . . . , 520-N of network queue 520, and may perform a weighting operation on the queued network traffic 330. For example, in one implementation, first level network WFQ queue 530 may perform a WFQ operation on the queued network traffic 330. The WFQ operation may assign different scheduling priorities (e.g., weights) to each of the queued network traffic 330 exiting from queues 520-1, 520-2, . . . , 520-N (e.g., network traffic 330 exiting queue 520-1 may include a highest scheduling priority, network traffic 330 exiting queue 520-2 may include the next highest scheduling priority, etc.). In other implementations, first level network WFQ queue 530 may perform other weighting operations (e.g., fair queuing, etc.) on the queued network traffic 330. First level network WFQ queue 530 may store and/or may transmit weighted network traffic 560 to second level WFQ queue 540.

Second level WFQ queue 540 may receive weighted bypass traffic 550 and/or weighted network traffic 560, and may perform a weighting operation on traffic 550/560. For example, in one implementation, second level WFQ queue 540 may perform a WFQ operation on traffic 550/560 that may assign different scheduling priorities (e.g., weights) to weighted bypass traffic 550 and weighted network traffic 560. In one example, the WFQ operation may assign weights to traffic 550/560 so that traffic 550/560 may each include a share of available bandwidth (e.g., fifty percent of the bandwidth for weighted bypass traffic 550 and fifty percent of the bandwidth for weighted network traffic 560) and/or a minimum guaranteed bandwidth. In another example, the WFQ operation may assign weights to traffic 550/560 to provide adequate QoS to traffic 550/560. In other implementations, second level WFQ queue 540 may perform other weighting operations (e.g., fair queuing, etc.) on weighted bypass traffic 550 and/or weighted network traffic 560.

As further shown in FIG. 5, second level WFQ queue 550 may store and/or may transmit additionally weighted traffic 570 to one of stacking output ports 430. In one implementation, as described above in connection with FIG. 4, stacking output ports 430 (e.g., stacking output port 430-0) may transmit additionally weighted traffic 570 (e.g., additionally weighted bypass traffic 550) to another one of switching devices 300. In another implementation, as described above in connection with FIG. 4, stacking output ports 430 (e.g., stacking output port 430-P) may transmit additionally weighted traffic 570 (e.g., additionally weighted network traffic 560) to one of output ports 230. In other implementations, stacking output ports 430 may transmit additionally weighted traffic 570 based on the weights assigned to traffic 570, a traffic type (e.g., bypass traffic or network traffic) associated with additionally weighted traffic 570, and/or other traffic information (e.g., quality of service desired for the traffic, bandwidth requirements, etc.) associated with additionally weighted traffic 570.

Although FIG. 5 shows exemplary components of stacking interface queue 400, in other implementations, stacking interface queue 400 may contain fewer, different, or additional components than depicted in FIG. 5. In still other implementations, one or more components of stacking interface queue 400 may perform one or more of the tasks described as being performed by one or more other components of stacking interface queue 400.

Exemplary Process

FIGS. 6A and 6B are flowcharts of an exemplary process 600 capable of being performed by network device 110. As shown in FIG. 6A, process 600 may begin with receipt of network traffic (block 605), and/or receipt of bypass traffic (block 610). For example, in one implementation described above in connection with FIG. 4, network input ports 410 of network device 110 may receive network traffic 330. In another example, stacking input ports 420 of network device 110 may receive bypass traffic 320.

As further shown in FIG. 6A, the network traffic may be allocated and/or stored in a network queue (block 615), and/or the bypass traffic may be allocated and/or stored in a stacking queue (block 620). For example, in one implementation described above in connection with FIG. 5, network queue 520 of network device 110 may evenly allocate and/or store network traffic 330 to queues 520-1, 520-2, . . . , 520-N, or may allocate and/or store network traffic 330 to queues 520-1, 520-2, . . . , 520-N according to another allocation technique. In another example, stacking queue 500 of network device 110 may evenly allocate and/or store bypass traffic 320 to queues 500-1, 500-2, . . . , 500-N, or may allocate and/or store bypass traffic 320 to queues 500-1, 500-2, . . . , 500-N according to another allocation technique.

As also shown in FIG. 6A, the network traffic may be transmitted from the network queue to a first level network weighting queue (block 625), and/or the bypass traffic may be transmitted from the stacking queue to a first level stacking weighting queue (block 630). For example, in one implementation described above in connection with FIG. 5, network queue 520 may transmit queued network traffic 330 to first level network WFQ queue 530 of network device 110. In another example, stacking queue 500 may transmit queued bypass traffic 320 to first level stacking WFQ queue 510 of network device 110.

As shown in FIG. 6B, a weighted fair queuing operation may be performed on the network traffic (block 635), and/or a weighted fair queuing operation may be performed on the bypass traffic (block 640). For example, in one implementation described above in connection with FIG. 5, first level network WFQ queue 530 may perform a WFQ operation on the queued network traffic 330 that may assign different scheduling priorities (e.g., weights) to some or all of the queued network traffic 330 exiting from queues 520-1, 520-2, ..., 520-N. In another example, first level stacking WFQ queue 510 may perform a WFQ operation on the queued bypass traffic 320 that may assign different scheduling priorities (e.g., weights) to some or all of the queued bypass traffic 320 exiting from queues 500-1, 500-2, ..., 500-N.

As also shown in FIG. 6B, the weighted network and/or bypass traffic may be transmitted to a second level weighting queue (block 645), and/or a weighted fair queuing operation may be performed on the weighted network/bypass traffic (block 650). For example, in one implementation described above in connection with FIG. 5, first level network WFQ queue 530 may transmit weighted network traffic 560 to second level WFQ queue 540 of network device 110, and/or first level stacking WFQ queue 510 may transmit weighted bypass traffic 550 to second level WFQ queue 540. In another example, second level WFQ queue 540 may perform a WFQ operation on traffic 550/560 that may assign different scheduling priorities (e.g., weights) to weighted bypass traffic 550 and weighted network traffic 560.

As further shown in FIG. 6B, the additionally weighted traffic may be transmitted to a stacking output port (block 655), and/or may be transmitted to a switching device or an output port based one or more weights, traffic type, and/or other traffic information associated with the additionally weighted traffic (block 660). For example, in one implementation described above in connection with FIG. 5, second level WFQ queue 550 may transmit additionally weighted traffic 570 to one of stacking output ports 430 of network device 110. In another implementation described above in connection with FIG. 4, stacking output ports 430 may transmit additionally weighted traffic 570 (e.g., additionally weighted bypass traffic 550) to another one of switching devices 300, and/or may transmit additionally weighted traffic 570 (e.g., additionally weighted network traffic 560) to one of output ports 230. In other implementations, stacking output ports 430 may transmit additionally weighted traffic 570 based on the weights assigned to traffic 570, a traffic type (e.g., bypass traffic or network traffic) associated with additionally weighted traffic 570, and/or other traffic information (e.g., quality of service desired for the traffic, bandwidth requirements, etc.) associated with additionally weighted traffic 570.

CONCLUSION

Systems and methods described herein may provide a network device traffic class mapping function. For example, in one implementation, the network device may receive network traffic on a network port of a switching silicon device, and may receive bypass traffic on a stacking port of the switching device. The switching silicon device may allocate and/or store the network traffic in a network queue, and may allocate and/or store the bypass traffic in a stacking queue. The switching silicon device may perform a first level WFQ operation on the network traffic and/or the bypass traffic, and may perform a second WFQ operation on the weighted network traffic and/or the weighted bypass traffic. The switching silicon device may transmit the additionally weighted traffic to another switching silicon device of the network device or to an output port of the network device based on weights assigned to the additionally weighted traffic, traffic type, and/or other traffic information.

The foregoing description provides illustration and description, but is not intended to be exhaustive or to limit the embodiments to the precise form disclosed. Modifications and variations are possible in light of the above teachings or may be acquired from practice of the invention.

For example, while a series of acts has been described with regard to the flowcharts of FIGS. 6A and 6B, the order of the acts may differ in other implementations. Further, non-dependent acts may be performed in parallel.

Embodiments, as described above, may be implemented in many different forms of software, firmware, and hardware in the implementations illustrated in the figures. The actual software code or specialized control hardware used to implement embodiments described above is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a network device that includes a plurality of network queues and a plurality of bypass queues, network traffic that is destined for a port of the network device and bypass traffic that is destined for another network device;
    receiving the network traffic at a set of network input queues of the network device;
    receiving the bypass traffic at a set of bypass input queues of the network device;
    performing a first weighting operation on the network traffic, received at the set of network input queues, to produce weighted network traffic;
    performing the first weighting operation on the bypass traffic, received at the set of bypass input queues, to produce weighted bypass traffic;
    performing a second weighting operation on the weighted network traffic and the weighted bypass traffic by assigning a first scheduling priority to the weighted network traffic and a second scheduling priority to the weighted bypass traffic to produce additionally weighted traffic, the first scheduling priority being different than the second scheduling priority, the first scheduling priority being assigned to the weighted network traffic and the second scheduling priority being assigned to the weighted bypass traffic such that the weighted network traffic includes approximately half an available bandwidth and the weighted bypass traffic includes approximately half the available bandwidth and each of the weighted network traffic and the weighted bypass traffic includes a minimum guaranteed bandwidth;
    routing the additionally weighted traffic to a set of output ports of the network device; and
    transmitting, by the network device, the additionally weighted traffic based on the first scheduling priority and the second scheduling priority assigned by the second weighting operation.

2. The method of claim 1, further comprising:
    allocating the network traffic in a network queue of the network device.

3. The method of claim 1, further comprising:
allocating the bypass traffic in a stacking queue of the network device.

4. The method of claim 1, where performing the first weighting operation on the network traffic and the bypass traffic comprises:
performing a weighted fair queuing (WFQ) operation on the network traffic and the bypass traffic.

5. The method of claim 1, where performing the first weighting operation on the network traffic and the bypass traffic comprises:
performing a fair queuing (FQ) operation on the network traffic and the bypass traffic.

6. The method of claim 4, where performing the second weighting operation comprises:
performing another WFQ operation on the weighted network traffic and the weighted bypass traffic to produce the additionally weighted traffic.

7. The method of claim 5, where performing the second weighting operation comprises:
performing another FQ operation on the weighted network traffic and the weighted bypass traffic to produce the additionally weighted traffic.

8. The method of claim 1, further comprising:
transmitting the additionally weighted traffic to a stacking output port of the network device.

9. The method of claim 1, where transmitting the additionally weighted traffic comprises:
transmitting the additionally weighted traffic further based on traffic type of the additionally weighted traffic.

10. The method of claim 1, where transmitting the additionally weighted traffic comprises:
transmitting the additionally weighted traffic further based on at least one of a quality of service desired for the additionally weighted traffic or bandwidth requirements of the additionally weighted traffic.

11. A system comprising:
one or more devices to:
receive network traffic and bypass traffic,
perform a first weighting operation on the network traffic and the bypass traffic to produce weighted network traffic and weighted bypass traffic, the first weighting operation being performed on the network traffic separately from the first weighting operation being performed on the bypass traffic,
perform a second weighting operation on the weighted network traffic and the weighted bypass traffic by assigning a first scheduling priority to the weighted network traffic and a second scheduling priority to the weighted bypass traffic to produce additionally weighted traffic,
the second weighting operation being performed on the weighted network traffic and the weighted bypass traffic together,
the first scheduling priority being different than the second scheduling priority,
the first scheduling priority being assigned to the weighted network traffic and the second scheduling priority being assigned to the weighted bypass traffic such that the weighted network traffic includes approximately half an available bandwidth and the weighted bypass traffic includes approximately half the available bandwidth and each of the weighted network traffic and the weighted bypass traffic includes a minimum guaranteed bandwidth, and
transmit the additionally weighted traffic based on the first scheduling priority and the second scheduling priority assigned by the second weighting operation.

12. The system of claim 11, where the one or more devices comprise at least one of switching chips, Ethernet switch devices, or switching integrated circuits.

13. The system of claim 11, where the one or more devices comprise a network device.

14. The system of claim 11, where the network traffic comprises traffic destined for a particular network device, of the one or more devices.

15. The system of claim 14, where the bypass traffic comprises traffic destined for a device, of the one or more devices, other than the particular network device.

16. The system of claim 11, where the one or more devices are further to:
allocate the network traffic in a network queue.

17. The system of claim 16, where the one or more devices are further to:
allocate the bypass traffic in a stacking queue.

18. The system of claim 11, where, when performing the first weighting operation, the one or more devices are further to:
perform a first weighted fair queuing (WFQ) operation on the network traffic and the bypass traffic to produce the weighted network traffic and the weighted bypass traffic.

19. The system of claim 18, where, when performing the second weighting operation, the one or more devices are further to:
perform a second WFQ operation on the weighted network traffic and the weighted bypass traffic to produce the additionally weighted traffic.

20. The system of claim 11, where the one or more devices are further to:
transmit the additionally weighted traffic to a stacking output port.

21. The system of claim 11, where, when transmitting the additionally weighted traffic, the one or more devices are further to:
transmit the additionally weighted traffic further based on a traffic type of the additionally weighted traffic.

22. The system of claim 11, where, when transmitting the additionally weighted traffic, the one or more devices are further to:
transmit the additionally weighted traffic further based on at least one of a quality of service desired for the additionally weighted traffic or bandwidth requirements of the additionally weighted traffic.

23. A network device comprising:
a stacking queue that receives bypass traffic and allocates, based on a destination of the bypass traffic, the bypass traffic in a first plurality of queues;
a network queue that receives network traffic and allocates, based on a destination of the network traffic, the network traffic in a second plurality of queues;
a first level stacking queue that receives the bypass traffic from the stacking queue and performs a first weighting operation on the bypass traffic to produce weighted bypass traffic;
a first level network queue that receives the network traffic from the network queue and performs the first weighting operation on the network traffic to produce weighted network traffic; and
a second level queue that receives the weighted bypass traffic and the weighted network traffic, and performs a second weighting operation on the weighted bypass traffic and the weighted network traffic by assigning a first scheduling priority to the weighted network traffic and a second scheduling priority to the weighted bypass traffic to produce additionally weighted traffic, the first scheduling priority being different than the second scheduling priority, the first scheduling priority being assigned to the weighted network traffic and the second scheduling priority being assigned to the weighted bypass traffic such that the weighted network traffic includes approximately half an available bandwidth and the weighted bypass traffic includes approximately half the available bandwidth and each of the weighted network traffic and the weighted bypass traffic includes a minimum guaranteed bandwidth.

24. The network device of claim 23, further comprising:
a stacking output port that receives the additionally weighted traffic and transmits the additionally weighted traffic based on the first scheduling priority and the second scheduling priority assigned by the second weighting operation.

25. The network device of claim 23, where the network device comprises a stacking interface queue.

26. A system comprising:
one or more memory devices to store instructions; and
one or more processors to execute the instructions, to:
receive network traffic with a destination address that identifies the system as a destination of the network traffic;
receive bypass traffic with a destination address that does not identify the system as a destination of the bypass traffic;
perform a first weighting operation on the network traffic to produce weighted network traffic;
perform the first weighting operation on the bypass traffic to produce weighted bypass traffic;
perform a second weighting operation on the weighted network traffic and the weighted bypass traffic by assigning a first scheduling priority to the weighted network traffic and a second scheduling priority to the weighted bypass traffic to produce additionally weighted traffic, the first scheduling priority being different than the second scheduling priority, the first scheduling priority being assigned to the weighted network traffic and the second scheduling priority being assigned to the weighted bypass traffic such that the weighted network traffic includes approximately half an available bandwidth and the weighted bypass traffic includes approximately half the available bandwidth and each of the weighted network traffic and the weighted bypass traffic includes a minimum guaranteed bandwidth; and
transmit the additionally weighted traffic based on the first scheduling priority and the second scheduling priority assigned by the second weighting operation.

27. The method of claim 1, further comprising:
performing, after the second weighting operation, scheduling on the additionally weighted traffic.

28. The method of claim 27, where the scheduling is based on the first scheduling priority and the second scheduling priority for the additionally weighted traffic.

29. The system of claim 11, where the one or more devices are connected in a linear topology, a ring topology, a chain topology, a mesh topology, or a tree topology.

30. The network device of claim 23, where a destination address of the network traffic identifies a port of the network device, and where a destination address of the bypass traffic does not identify any port of the network device.

31. The method of claim 1, where the first weighting operation is performed on the network traffic separately from the first weighting operation being performed on the bypass traffic, and
where the second weighting operation is performed on the weighted network traffic and the weighted bypass traffic together.

* * * * *